US012459783B2

(12) United States Patent
Boxum

(10) Patent No.: US 12,459,783 B2
(45) Date of Patent: Nov. 4, 2025

(54) METHOD TO DETERMINE A SPEED PROFILE FOR A STAIRLIFT

(71) Applicant: TK Home Solutions B.V., Krimpen aan den IJssel (NL)

(72) Inventor: Cornelis Boxum, Delfgauw (NL)

(73) Assignee: TK Home Solutions B.V., Krimpen aan den IJssel (NL)

( * ) Notice: Subject to any disclaimer, the term of this patent is extended or adjusted under 35 U.S.C. 154(b) by 0 days.

(21) Appl. No.: 18/421,262

(22) Filed: Jan. 24, 2024

(65) Prior Publication Data

US 2024/0286870 A1 Aug. 29, 2024

(30) Foreign Application Priority Data

Jan. 30, 2023 (EP) .................................... 23153841

(51) Int. Cl.

| | |
|---|---|
| ***B66B 5/00*** | (2006.01) |
| ***B66B 9/08*** | (2006.01) |
| ***G01G 19/44*** | (2006.01) |

(52) U.S. Cl.

CPC .......... *B66B 5/0037* (2013.01); *B66B 9/0807* (2013.01); *B66B 9/0838* (2013.01); *B66B 9/0846* (2013.01); *G01G 19/44* (2013.01)

(58) Field of Classification Search

CPC ................................ B66B 9/08; B66B 9/0838

See application file for complete search history.

(56) References Cited

U.S. PATENT DOCUMENTS

2014/0083801 A1* 3/2014 Vroegindeweij ..... B66B 9/0815 187/201

FOREIGN PATENT DOCUMENTS

| | | | | | |
|---|---|---|---|---|---|
| CN | 104995118 | A | * | 10/2015 | B66B 9/0815 |
| EP | 2452909 | A1 | * | 5/2012 | B66B 9/0807 |
| EP | 4296210 | A1 | * | 12/2023 | B66B 9/08 |
| RU | 2703812 | C1 | * | 10/2019 | |
| WO | 2005087644 | A2 | | 9/2005 | |
| WO | 2014/098575 | A1 | | 6/2014 | |
| WO | WO-2019238736 | A1 | * | 12/2019 | B66B 1/30 |
| WO | 2020079395 | A2 | | 4/2020 | |

OTHER PUBLICATIONS

Machine Translation of CN 104995118.*

* cited by examiner

*Primary Examiner* — Diem M Tran

(74) *Attorney, Agent, or Firm* — Dinsmore & Shohl LLP

(57) ABSTRACT

Embodiments described herein are directed to a method to determine a speed profile for a stairlift, wherein the stairlift includes a guide device, a carriage, and user interaction device. The carriage is rotatable around a vertical axle by a first drive. A specific mass moment of inertia for a specific person is determined by measuring a correlation between applied torque and resulting rotational acceleration for the first drive or the specific mass moment of inertia for a specific person is determined by measuring the specific persons weight while the specific person is carried on the carriage. An optimal torque is set according to the specific mass moment of inertia. The speed profile is determined applying at the most the optimal torque with the first drive.

20 Claims, 1 Drawing Sheet

METHOD TO DETERMINE A SPEED PROFILE FOR A STAIRLIFT

CROSS REFERENCE TO RELATED APPLICATIONS

This application is a continuation-in part of and claiming priority from European Patent Application No. 23 153 841.4, filed on Jan. 30, 2023, the disclosure of which is herein incorporated by reference in its entirety.

TECHNICAL FIELD

The present disclosure generally relates to a method to determine a speed profile for a stairlift for transporting a person along a staircase, wherein the stair case includes a guide extending along the staircase, a carriage being moveable along the guide and configured to carry a person, and user interaction device for operating the stairlift, and wherein the carriage is rotatable around a vertical axle by a first drive. The present disclosure further relates to such a stairlift.

BACKGROUND

Stairlifts are known from the state of the art. With such, persons unable to use a staircase, e.g. due to disability or certain conditions, are transported along the staircase between a lower and an upper landing position and/or intermediate landing positions, while the staircase is still fully usable for other persons in its usual sense. Such stairlifts have guide like a rail or the like, on which the carriage is moved, e.g. by a drive unit connected to the guide, wherein the drive unit may include further components of the stairlift. A carriage for a stairlift usually is a chair, which allows for rest of arms and feet, may be foldable to allow other use of the staircase and takes a certain boarding position at the landing positions. Stairlifts are mostly retrofitted with already existing staircases.

With such stairlifts, a need exists to get from one landing position to another in a fast manner but at the same time save and at good comfort. However, comfort and safety may be reduced above a certain speed, in particular when the guide turns around a vertical or horizontal axle and/or when the carriage is rotated around the vertical axle, e.g. to avoid confrontation with steps of the staircase or to avoid contact with a wall of a stairwell as described in WO 2005/087644. In such situations, movements/rotation of the carriage in different directions overlay with each other.

While the comfort is mostly an individual aspect and tolerable speed may therefore differ from user to user, safety aspects may be specified in laws or regulations and therefore set a limit to traveling speed of the carriage. Further, traveling speed may be limited by the performance of drives of the stairlift, depending on the body weight and body form of a user.

In the state of the art, speed profiles are determined by so called rail-data, determining a rotational position and a speed for the carriage at a certain position of the guide, while leveling of the carriage is performed stand-alone by a leveling mechanism. However, such rail-data does not lead to an optimal speed profile for fast traveling/short travel time and good comfort at the same time and further must often be (re)defined by a technician during installation of the stairlift, which is time consuming.

WO 2020/079395 A2 discloses a stairlift and a method of operating the same. The stairlift includes a stairlift rail, a carriage, a chair pivotally mounted on the carriage, at least one motion sensor and a control system. The control system is operable to store a record of an undesirable movement of the chair. The control system is also operable, during a subsequent traversal of the rail by the carriage, to apply a remedy to attempt to prevent a reoccurrence of the undesirable movement of the chair at the position indicated in the record, The control system is further operable to determine whether the undesirable movement of the chair reoccurred.

SUMMARY

Based on the state of art described above, it is an object of the present disclosure to provide fast, comfortable and desirable travel by a stairlift.

This object is solved by the features of the independent claims. Advantageous embodiments are indicated in the dependent claims. Where technically possible, the features of the dependent claims may be combined as desired with the features of the independent claims and/or other dependent claims.

In particular, the object is solved by a method to determine a speed profile for a stairlift for transporting a person along a staircase, wherein the stairlift includes guide extending along the staircase, a carriage being moveable along the guide and configured to carry a person, and a user interaction device for operating the stairlift, wherein the carriage is rotatable around a vertical axle by a first drive, wherein a specific mass moment of inertia for a specific person is determined by measuring a correlation between applied torque and resulting rotational acceleration for the first drive with the specific person carried on the carriage or the specific mass moment of inertia for a specific person is determined by measuring the specific persons weight while the specific person is carried on the carriage, wherein an optimal torque is set according to the specific mass moment of inertia, and wherein the speed profile is determined applying at the most the optimal torque with the first drive.

Insofar as elements are designated with the aid of numbering, for example “first element”, “second element” and “third element”, this numbering is provided purely for differentiation in the designation and does not represent any dependence of the elements on one another or any mandatory sequence of the elements. In particular, this means that, for example, a device or method need not have a “first element” in order to have a “second element”. Also, the device or method may have a “first element”, as well as a “third element”, but without necessarily having a “second element”. There may also be multiple units of an element of a single numbering, for example multiple “first elements”.

The guide may for example be rails, tracks or the like and may be integrated or retrofitted to the staircase, e.g. at steps of the staircase, e.g. standing on the tread of a number of steps, at a balustrade of the staircase or a wall next to the staircase. They may include at least one such rail or track or at least two rails or tracks running next to each other. The guide may run parallel to the slope of the staircase and extend horizontally or vertically into landing positions at the lower end, the upper end, or an intermediate position of the staircase.

A carriage may include a drive unit which is connected to and guided by the guide and on which the chair or platform is mounted in a pivotable manner to allow leveling in an upright position when the orientation of the guide vary. The carriage may further include a chair, wherein the chair may include arm rests, footrests, and a chair belt to provide for safe accommodation of the transported person. In a landing position, the chair may turn away from the stairs to allow for pleasant boarding from a floor level. Such turn may be implemented by a trajectory of the guide or may be implemented by the first drive by rotation the carriage around the vertical axle. A carriage may further/alternatively to the chair include a platform to carry a wheelchair, wherein the platform may include balustrades, at least one door in the balustrades and retention devices such as belts, hooks, bars and the like. In some embodiments, in the landing position, the platform is leveled with a floor. A second drive for moving the carriage along the rail, e.g. an electric motor, such as a brushed or brushless DC motor, a stepper motor or a servo motor, may be housed in a drive unit or may be of separate configuration from the carriage while being connected to the carriage with traction or integrated in the guide.

User interaction device may include, without limitation, a joystick, a rotatable knob, a touchpad, a touchscreen, one or more button/s, a remote control or the like and may further be coupled, attached, positioned or located at the carriage, e.g. at an arm rest or at a balustrade of a platform, via a fastener such as bolt and nut, rivet, screw, hook and loop, weld, adhesive, epoxy, and/or the like and/or may be located in at least one landing position, e.g. at a wall or at a balustrade of the staircase, such as a remote control via the fastener. The user interaction device may have an active state and inactive state, which may be associated to certain positions of the interaction device.

The carriage is rotatable around the vertical axle relative to the guide. E.g. the carriage may include a drive unit connected to the guide, wherein the orientation of the drive unit against the guide is fixed and wherein the chair or the platform is rotatable against the drive unit. The first drive may then be housed in the drive unit. The present disclosure also refers to systems, wherein the entire carriage is rotatable against the guide in any form. The first drive may be an electric motor, such as a brushed or brushless DC motor, a servo motor or a stepper motor.

The optimal torque may be set according to the specific mass moment of inertia to reach a certain rotational acceleration with the specific person carried on the carriage. This acceleration may be defined due to comfort conditions or according to a specific movement situation of the carriage, e.g. at a straight part of the guide or in a turn of the guide. In some aspects, the optimal torque is defined as the maximum torque, which can be applied according to comfort conditions and/or drive power. Translational speed along the guide may be limited by comfort, safety conditions, available performance of the first drive and/or by regulations. For example, optimal torque may be defined due to comfort conditions for a light person while for a heavy person, optimal torque is defined by the maximum performance of the first drive.

A speed profile defines the movement of the carriage along the trajectory of the guide, wherein the movement refers to the speed/position in any (rotational) direction, such as the translational speed along the guide (e.g. by the second drive), rotational speed or rotational position around a vertical axle (e.g. by the first drive) and/or rotational speed or rotational position around a horizontal axle (e.g. by a leveling mechanism). Accordingly, the time and/or position, where a specific movement of the carriage is started or stopped and a gradient of acceleration or deceleration are defined in the speed profile, for the movement of the carriage along the guide and for the rotational movement by the first drive. As an example, the speed profile defines that a rotation of the carriage is started a specific distance before a turn is coming up in the trajectory of the guide or before a specific position of the staircase is reached, and further defines, which torque is applied, which angle the rotation has to reach, which rotational speed may be applied at the most and/or at which speed the carriage moves along the guide during rotation around the vertical axle.

By activating the user interaction device, the carriage is moved along the guide according to the speed profile.

Within the description and the claims, the terms “person” and “user” are used interchangeable and describe a person interacting with the stairlift in some way. The specific terms are used as best fit in a particular context, wherein “person” mostly refers to the transportation as such and the “user” mostly refers to a/the person interacting with the stairlift during operation.

According to the technical teaching of the present disclosure, the specific mass moment of inertia differs for different persons carried on the carriage. This is due to the different weight of different persons and also due to the different body forms of different persons, defining how the body weight is positioned relative to the vertical axle. Further impact is taken by a (adjustable) height position of the chair/platform over the drive unit and possible offset of the chair/platform/user position over the vertical axle. Thus, a first drive applying a fixed torque value to the carriage may lead to uncomfortable fast rotation for a person with a low specific mass moment of inertia (e.g. a very light person) and time inefficient slow rotation for a person with a high specific mass moment of inertia (e.g. a very heavy person). By determining the specific mass moment of inertia, the optimal torque applied can be chosen for good comfort and low travelling time for any specific person by setting up the speed profile accordingly. In particular, the optimal torque may be chosen according to what the specific person regards to still be comfortable, e.g. by inputting such information in the method during setting the optimal torque. Vice versa, the speed profile can be set up to be optimized for a fast traveling speed at good comfort and safety conditions with the specific mass moment of inertia, e.g. a specific distance before a turn of the guide may be defined accordingly to reach a desired rotational angle before the turn of the guide without reducing the speed of the carriage along the guide.

According to one aspect, the specific mass moment of inertia for a specific person is determined by measuring a correlation between applied torque and resulting rotational acceleration for the first drive with the specific person carried on the carriage. From this, a value can be calculated directly and precisely, as the mass moment of inertia directly corresponds to said correlation. According to another alternative aspect, the specific mass moment of inertia for a specific person is determined by measuring the specific persons weight while the specific person is carried on the carriage. This aspect does not consider the body form of a person but may result in reasonable assumptions for the specific mass moment of inertia by assuming standard body forms and may be simple to implement, e.g. when a weight sensor is already integrated in a stairlift.

In one embodiment of the method, the correlation between applied torque and resulting rotational acceleration is measured in a test rotation for determining the specific mass moment of inertia. In such test rotation, a defined torque may be applied to the carriage by the first drive and the resulting rotational acceleration or a resulting rotational speed is measured. Alternatively, a defined rotational speed may be set and the torque applied and/or the time to reach the defined rotational speed is measured. Several runs of the test rotation may be conducted, wherein the person carried on the carriage may take (slightly) different positions in/on the carriage, wherein the specific mass moment of inertia is derived as an average value of measured values over the several runs of the test rotation.

In one embodiment, the test rotation is conducted once during installation of the stairlift. This is, the specific mass moment of inertia for a specific person is set once and assumed to not change. The set specific mass moment of inertia may be reset by another test rotation during maintenance in order to be adapted e.g. according to loss or increase of weight of the specific person. Advantageously, the test rotation may then be assisted by a technician or service employee and regular use of the stairlift can be conducted without any further measures regarding the determination of the specific mass moment of inertia. The test rotation may be conducted for more than one specific person, wherein the specific mass moment of inertia or a specifically determined speed profile is then associated to different user profiles.

Alternatively, the test rotation is conducted before a ride, in particular before every ride of the stairlift. This is, the test rotation may be implemented in the regular use of the stairlift, e.g. by rotating the carriage from a landing position into a start position at the beginning of a ride. Advantageously, the specific mass moment of inertia is then set to an actual weight/body form/position of the specific person at the time of use and the method considers the fact, that body weight and body form may change in relatively short time.

Further, by conducting the test rotation at the beginning of the ride, the method is conducted for the specific person actually being carried on/in the carriage and is therefore set properly for any person using the stairlift, no matter if the person has a user profile or uses the stairlift regularly.

In some embodiments, the test rotation is conducted in a landing position of the carriage. In a landing position, movement for test rotation can be conducted independent from the positioning of the carriage relative to the steps of the staircase. Thus, test rotation can be implemented in the movement of the stairlift easily at the landing position. Further, when the carriage is turned away from the staircase in a landing position for reaching at a comfortable boarding position, this turn can be conducted by the first drive and can include the test rotation.

In an embodiment, the speed profile may be determined applying at the most an optimal rotational speed for the first drive. Likewise the optimal torque, optimal rotational speed may be chosen for optimizing the speed profile regarding reduced travel time and for providing sufficient comfort, in particular regrading individual comfort preferences of the specific person.

In an embodiment, the speed profile is determined with information on a trajectory of the guide. E.g., information about the incline and/or any turns of the guide and/or distance between the guide and steps or walls are included to determine any speeds along the rail. For example, when a turn is coming up along the trajectory at a certain position of the guide and the turn requires the carriage to be rotated around the vertical axle, the information includes the position of the turn and the angle of rotation required. The speed profile can then be set to start the rotation early enough to reach the required angle of rotation at the position of the turn by applying at the most the optimal torque and/or optimal rotational speed and without reducing the translational speed of the carriage along the guide, e.g. below a value given by a regulation, before the turn. In one embodiment, the trajectory includes at least one change of direction around a vertical axle and/or at least one change of direction around a horizontal axle. The turn around the vertical axle of the guide may or may not necessitate a rotation of the carriage around the vertical axle while the turn around the horizontal axle of the guide might necessitate a rotation of the carriage by the leveling mechanism.

In a further embodiment, the speed profile is determined with information on a necessary angle of rotation around the vertical axle of at least one position of the carriage along the guide. E.g., the carriage needs to be positioned in a certain rotational angle at a specific step of a spiral staircase, to fit in a narrow stairwell along the extension of the stairwell, or to take a narrow turn of the guide without collision with a wall. Advantageously, with this information, the speed profile can be set up for the carriage to reach the rotational angle at the distinguished position of the guide in the fastest, yet still comfortable manner. The information on a necessary angle of rotation may or may not be associated with information on the trajectory of the guide.

In some embodiments, a necessary angle of rotation is set by rotating the carriage manually for at least one position of the carriage along the guide, such as during a test run of the carriage along the guide. Thus, the stairlift is configured to allow manual rotation of the carriage around the vertical axle at least during the test run, e.g. by decoupling the first drive from the carriage, while the rotational angle of the carriage is still monitored or registered in some way. The carriage may then be moved along the guide by hand or by the second drive at a slow speed and may be positioned in the necessary angles at certain positions. While being positioned in a certain position and/or rotational angle, the stairlift may register the position/rotational angle and set/determine values for the speed profile accordingly.

In an embodiment, which was already referenced in the preceding description, the stairlift includes a leveling mechanism for keeping the carriage in a horizontal orientation, wherein the speed profile is determined with information on an angle of the leveling mechanism of at least one position of the carriage along the guide. The leveling mechanism may be configured to keep the carriage leveled in a stand-alone manner, e.g. as a closed control circuit, or the angle of the leveling mechanism may be determined by the speed profile, wherein for example the position, rotational speed or rotational acceleration of a third drive driving the leveling mechanism is determined by the speed profile. The information on the angle of the leveling mechanism may be set/tracked for at least one position of the carriage along the guide during a test run of the carriage along the guide, wherein the carriage is kept leveled e.g. by the stand-alone leveling mechanism or by any other mechanism, device, and/or process, e.g. manually, during the test run.

In an embodiment, which was generally referenced in the preceding description, the speed profile is optimized for shortest travel time. This is, the translational speed of the carriage along the guide is kept at the highest level to be considered comfortable by a person using the stairlift and to be allowed by regulations, while rotation of the carriage around the vertical axle is configured to avoid slowing of the translational movement. Further, the movement around turns of the guide, either turns around a vertical axle or turns around a horizontal axle, may be configured to be conducted at optimal translational speed, e.g. by implementing counter movements with the first drive or the leveling mechanism allowing a high translational speed.

The object is further solved by a stairlift for transporting a person along a staircase, including a guide extending along the staircase, a carriage being moveable along the guide and configured to carry a person, and user interaction device for operating the stairlift, wherein the carriage is rotatable around a vertical axle by a first drive, and wherein the stairlift is configured to measure a correlation between applied torque and resulting rotational acceleration for the first drive and/or the specific persons weight while the specific person is carried on the carriage. The terms used within the definition of the stairlift are to be understood in the same manner they are described before regarding the method. The first drive may be a brushed or brushless DC motor, a servo motor or a stepper motor, which is capable of tracking its rotational position and reporting it to a control system. With the stairlift, the predescribed method may be implemented to reach the advantages described in reference to the method accordingly. The stairlift may include a control unit, which the predescribed method is implemented with.

The control unit may be an electronic control unit, a central processing unit (CPU), and the like, for performing the functions as described herein. As such, the control unit may be configured to receive, analyze and process sensor data, perform calculations and mathematical functions, convert data, generate data, control system components (e.g., the first drive, the second drive, the third drive, the carriage, and the like), and the like. The control unit may include one or more processors, and other components, for example one or more memory modules that stores logic that is executable by the one or more processors and a database based on, for example, user inputs provided via the user interaction device. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, and the like, that may be compiled or assembled into computer-executable instructions and storage on the one or more memory modules. Alternatively, the computer-executable instructions may be written in hardware description language, such as logic implemented via either a field programmable gate array (FPGA) configuration or an application specific integrated circuit (ASIC), all their equivalents. Accordingly, the systems, methods, processes, and/or computer product programs described herein may be implemented in any conventional computer programming language, as preprogrammed hardware elements, or as a combination of hardware and software components. Further, provided herein is a computer program product for use with or by the control unit for controlling components of the starilift (e.g., the first drive, the second drive, the third drive, the carriage, and the like). The computer program product may include a computer usable medium having computer readable readable instruction or program code embodied on the computer usable medium.

In an embodiment of the stairlift, it further includes a leveling mechanism for keeping the carriage in a horizontal orientation along the guide. The leveling mechanism may be configured to keep the carriage leveled in a stand-alone manner, e.g. as a closed control circuit, or the angle of the leveling mechanism may be determined by the speed profile, wherein for example the position, rotational speed or rotational acceleration of a third drive driving the leveling mechanism is determined by the speed profile.

BRIEF DESCRIPTION OF THE DRAWINGS

In the following, the present disclosure is explained in more detail with reference to the accompanying figures using examples of embodiments. The formulation figure is abbreviated in the drawings as Fig.

DETAILED DESCRIPTION

The described embodiments are merely examples that can be modified and/or supplemented in a variety of ways within the scope of the claims. Any feature described for a particular embodiment example may be used independently or in combination with other features in any other embodiment example. Any feature described for an embodiment example of a particular claim category may also be used in a corresponding manner in an embodiment example of another claim category.

Figure 1:
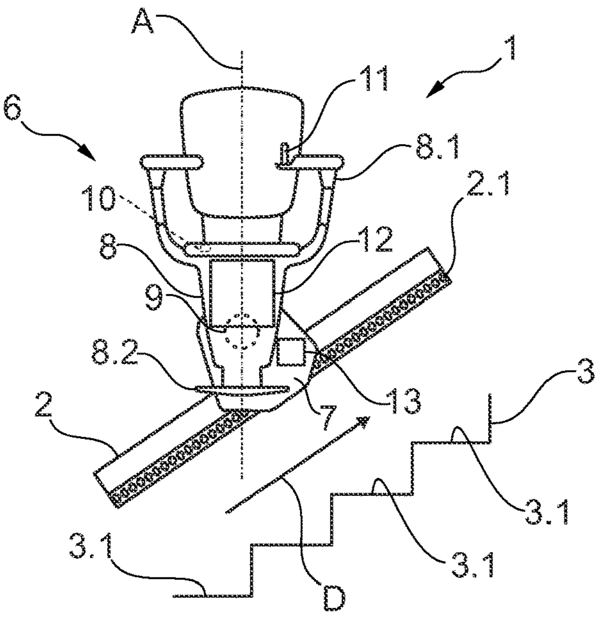
FIG. 1 schematically depicts a view of a stairlift according to an aspect of the present disclosure.

FIG. 1 shows a stairlift 1, to which the embodiments described herein can be applied. The stairlift 1 includes a guide 2 formed as a rail and running parallel to the slope of a staircase 3 in a direction D, wherein the staircase 3 has a number of steps 3.1. The stairlift 1 further includes a carriage 6, which can move along the guide 2 in or against the direction D, and which includes a drive unit 7 and a chair 8, wherein the chair 8 is connected to the drive unit 7 in a pivotable manner by a leveling mechanism 9. For driving the carriage 6, positive engagements devices 2.1 are provided on the guide 2, which cooperate with a second drive (not shown) for driving the carriage 6 along the guide 2 in a translational movement, such as a driven pinion, of the drive unit 7.

The chair 8 includes arm rests 8.1 and a footrest 8.2 and user interaction device 11 in the form of a joystick. By pushing/pulling the user interaction device 11 to a corresponding side, the carriage 6 may be driven to the according side in the direction D. The user interaction device 11 are pictured in an upright position which is associated to an active state, while they might be folded, e.g. into a recess at the arm rest 8.1, to get deactivated and avoid unintended actuation.

The carriage 6 further includes a first drive 12 which is shown schematically and with which the carriage 6, in particular the chair 8 is rotatable around a vertical axle A. The first drive 12 may be a brushed or brushless DC motor, a servo motor or a stepper motor. With a rotational angle phi set by the first drive 12, the carriage 6 can be positioned to avoid collision with steps 3.1, or walls, to (pre)position for translational movement of the carriage 6 through a turn of the guide 2 at highest possible translational speed or to provide a comfortable and safe boarding position in a landing position of the carriage 6. Accordingly, the guide 2 can have a curved shape, which deviates from a straight line.

The direction of travel D and/or the inclination of the guide 2 may change at least once during the course of the guide 2 and the guide 2 may run out horizontally at a landing position, wherein the chair 8 is hold in an upright position due to the leveling mechanism 9. Thus, the guide 2, or components thereof, follow a certain trajectory having turns around horizontal and/or vertical axles or both axles at the same time.

The carriage 6, the drive unit 7 thereof, may include a control unit 13, which is connected to the first drive 12 and with which a torque applied by the first drive 12 to the carriage 6 can be determined. Further, the carriage 6, via the control unit 13, may include or be communicatively coupled to sensors or other devices to measure the angle of rotation phi of the first drive 12, the torque applied by the first drive 12 and/or the rotational speed of the first drive 12. The carriage 6 may further include a weight sensor 10 to measure the mass of the chair 8 and/or a person carried on the chair 8.

As discussed above, the control unit 13 may be an electronic control unit, a central processing unit (CPU), and the like, for performing the functions as described herein. As such, the control unit 13 may be configured to receive, analyze and process sensor data, perform calculations and mathematical functions, convert data, generate data, control system components (e.g., the first drive, the second drive, the third drive, the carriage, and the like), and the like. The control unit 13 may include one or more processors, and other components, for example one or more memory modules that stores logic that is executable by the one or more processors and a database based on, for example, user inputs provided via the user interaction device. Each of the one or more processors may be a controller, an integrated circuit, a microchip, central processing unit or any other computing device.

Figure 2:
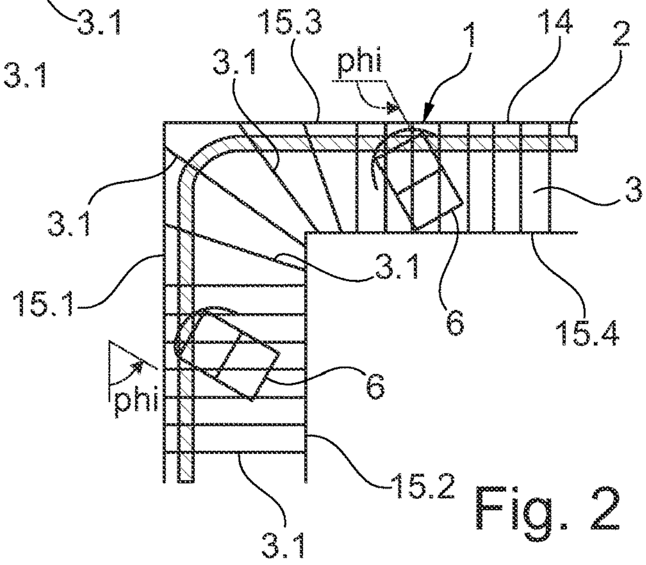
FIG. 2 schematically depicts a top plan view of a stairwell according to one or more embodiments shown and described herein.

FIG. 2 shows a top plan view of a stairwell 14, with a stairlift 1 therein. The stairwell 14 has walls 15.1, 15.2, 15.3, 15.4, and steps 3.1. Carriage 6 is drawn at two positions along guide 2, where it makes an angle phi relative to guide 2. The staircase 3 makes a turn of 90 degrees. In the turn, steps 3.1 narrow in the direction of the center of the turn. When carriage 6 is moved along the guide 2, the carriage 6 needs to be prevented from hitting the walls 15.1, 15.2, 15.3, 15.4 of the stairwell 14 or the steps 3.1. Whether there is a risk of this happening depends on inter alia the width of the stairwell 14 and the height of guide 2 above the steps 3.1. Even when guide 2 are mounted so high above the steps 3.1 that there is no risk of collision with steps 3.1 on the straight parts of the staircase 3, there may, for instance, be a local risk of collision in the turn due to the narrowing of steps 3.1. The risk of collisions with steps 3.1 in the turn is avoided by rotating the carriage 6 locally in the turn relative to the guide 2 around the vertical axle A in order to avoid collision with steps 3.1. The speed values and angle values describing the movement of the carriage 6 are defined in a speed profile, which defines at least the translational speed/acceleration of the carriage 6 along the guide 2 and the rotational speed/acceleration of the carriage 6 around the vertical axle A.

Figure 3:
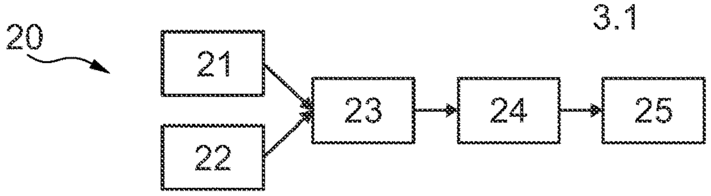
FIG. 3 schematically depicts an illustrative flowchart for a method according to an aspect of the present disclosure.

Now referring to FIG. 3, a method 20 to determine a speed profile for fast traveling along the guide 2 at high comfort and sufficient safety conditions includes in a first step 21 measuring a correlation between applied torque and resulting rotational acceleration for the first drive 12 with the specific person carried on the carriage 6. In an alternative second step 22 measuring the specific persons weight while the specific person is carried on the carriage 6 (e.g., via weight sensor 10). With the measured value, a specific mass moment of inertia is determined for the specific person in a third step 23. Either the specific mass moment of inertia is calculated from the value received from the first step 21 or the specific mass moment of inertia is estimated with the value received from the second step 22. In a fourth step 24, an optimal torque is set according to the specific mass moment of inertia received from the third step 23. This optimal torque may be set according to generally defined comfort conditions to avoid too fast or too slow rotation of the carriage 6, may be set to comfort conditions individually defined by the specific person and/or may be defined by regulations. Finally, in a fifth step 25, the speed profile is determined applying at the most the optimal torque with the first drive 12. Thus, the speed profile can be optimized for fast travelling with the optimal torque set.

Figure 4:
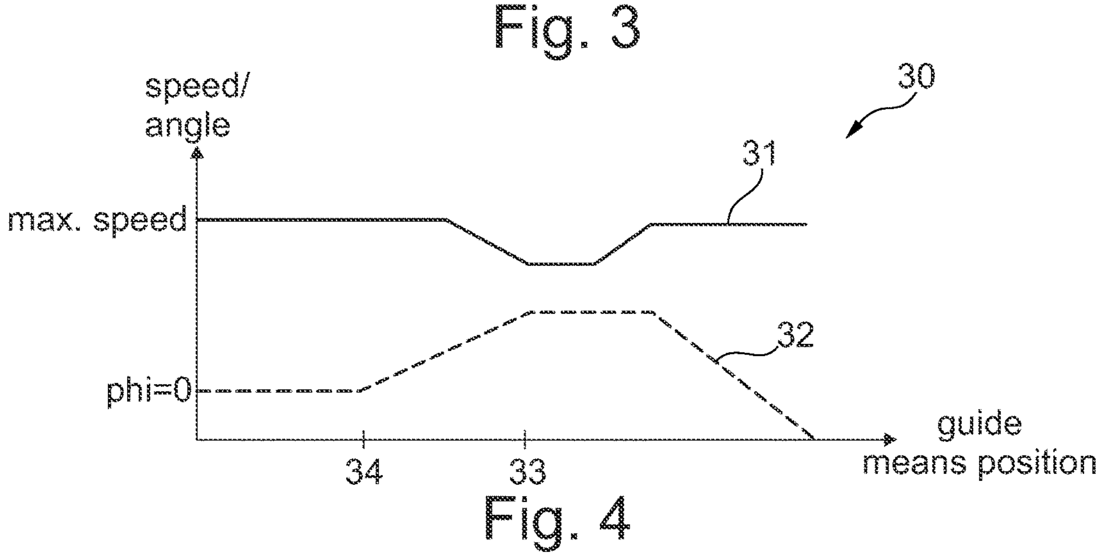
FIG. 4 schematically depicts an illustrative diagram of an exemplary speed profile according to one or more embodiments shown and described herein.

FIG. 4 shows an speed profile 30 with the position of the carriage 6 along the guide 2 on the x-axis and the translational speed of the carriage 6 along the guide 2 and the rotational angle phi on the y-axis. A first graph 31 represents translational speed values of the carriage 6 along the guide 2 and a second graph 32 represents values of the rotational angle phi. At a position 33 of the guide 2, a specific angle phi has to be reached, e.g. for a turn of the guide 2 beginning at this position. Therefore the carriage 6 starts to rotate at position 34 at a certain torque of the first drive 12. The angle phi is then kept constant after the position 33, e.g. as long as the carriage 6 is in the turn. Afterwards, a counter wise rotation of the carriage 6 is conducted, e.g. to rotate the carriage 6 to an angle phi required at a landing position. The speed at the same time is kept at an optimal most of the time, while being reduced during the turn, e.g. to allow the angle phi at position 33 to be reached and/or to increase comfort in the turn.

The invention claimed is:

1. A method to determine a speed profile for a stairlift for transporting a person along a staircase, wherein the stairlift comprises

- a guide extending along the staircase;
- a carriage being moveable along the guide and configured to carry the person;
- a user interaction device configured for operating the stairlift; and
- a control unit configured to measure a correlation between applied torque and resulting rotational acceleration for a first drive;
- wherein the carriage is rotatable around a vertical axle by the first drive;
- wherein the method comprises the steps of:
- determining a specific mass moment of inertia for a specific person by measuring the correlation between applied torque and resulting rotational acceleration for the first drive with the specific person carried on the carriage;
- setting an optimal torque according to the specific mass moment of inertia; and
- determining the speed profile applying at the most the optimal torque with the first drive.

2. The method according to claim 1, wherein the correlation between applied torque and resulting rotational acceleration is measured in a test rotation, wherein the test rotation is conducted once during installation of the stairlift.

3. The method according to claim 1, wherein the speed profile is determined applying not more than an optimal rotational speed for the first drive.

4. The method according to claim 1, wherein the speed profile is determined with information on a trajectory of the guide, wherein the trajectory comprises at least one change of direction around a vertical axle and/or at least one change of direction around a horizontal axle.

5. The method according to claim 1, wherein:

the speed profile is determined with information on a necessary angle of rotation around the vertical axle of at least one position of the carriage along the guide, wherein a necessary angle of rotation is set by rotating the carriage manually for at least one position of the carriage along the guide during a test run of the carriage along the guide.

6. The method according to claim 1, wherein the stairlift further comprises:

a leveling mechanism for keeping the carriage in a horizontal orientation, and wherein the speed profile is determined with information on an angle of the leveling mechanism of at least one position of the carriage along the guide.

7. A method to determine a speed profile for a stairlift for transporting a person along a staircase, wherein the stairlift comprises a guide extending along the staircase;

a carriage being moveable along the guide and configured to carry the person;

user interaction device configured for operating the stairlift; and a weight sensor configured to measure a specific persons weight while the specific person is carried on the carriage;

wherein the carriage is rotatable around a vertical axle by a first drive;

wherein the method comprises the steps of:

determining a specific mass moment of inertia for the specific person by measuring the specific persons weight while the specific person is carried on the carriage with the weight sensor;

setting an optimal torque according to the specific mass moment of inertia; and determining the speed profile applying at the most the optimal torque with the first drive.

8. The method according to claim 7, wherein the specific mass moment of inertia for the specific person is determined in a test rotation, wherein the test rotation is conducted once during installation of the stairlift.

9. The method according to claim 8, wherein the test rotation is conducted before a ride.

10. The method according to claim 8, wherein the test rotation is conducted in a landing position of the carriage.

11. The method according to claim 7, wherein the speed profile is determined applying not more than an optimal rotational speed for the first drive.

12. The method according to claim 7, wherein the speed profile is determined with information on a trajectory of the guide.

13. The method according to claim 12, wherein the trajectory comprises at least one change of direction around a vertical axle and/or at least one change of direction around a horizontal axle.

14. The method according to claim 7, wherein the speed profile is determined with information on a necessary angle of rotation around the vertical axle of at least one position of the carriage along the guide.

15. The method according to claim 14, wherein a necessary angle of rotation is set by rotating the carriage manually for at least one position of the carriage along the guide during a test run of the carriage along the guide.

16. The method according to claim 7, wherein the stairlift further comprises:

a leveling mechanism for keeping the carriage in a horizontal orientation, and wherein the speed profile is determined with information on an angle of the leveling mechanism of at least one position of the carriage along the guide.

17. The method according to claim 16, wherein the angle of the leveling mechanism is set for at least one position of the carriage along the guide during a test run of the carriage along the guide.

18. The method according to claim 7, wherein the speed profile is optimized for shortest travel time.

19. A stairlift for transporting a person along a staircase, comprising:

a guide extending along the staircase;

a carriage being moveable along the guide and configured to carry the person; and user interaction device configured for operating the stairlift;

wherein the carriage is rotatable around a vertical axle by a first drive, wherein the stairlift further includes a control unit configured to measure a correlation between applied torque and resulting rotational acceleration for the first drive and/or a weight sensor to measure the specific persons weight while the specific person is carried on the carriage.

20. The stairlift according to claim 19, further comprising:

a leveling mechanism for keeping the carriage in a horizontal orientation along the guide.

* * * * *